US009682770B2

(12) United States Patent
Mazarguil

(10) Patent No.: US 9,682,770 B2
(45) Date of Patent: Jun. 20, 2017

(54) AIRCRAFT LANDING GEAR EQUIPPED WITH WHEEL DRIVING MEANS

(71) Applicant: MESSIER-BUGATTI-DOWTY, Velizy Villacoublay (FR)

(72) Inventor: Nicolas Mazarguil, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 8 days.

(21) Appl. No.: 14/640,440

(22) Filed: Mar. 6, 2015

(65) Prior Publication Data

US 2016/0176516 A1 Jun. 23, 2016

(30) Foreign Application Priority Data

Mar. 12, 2014 (FR) ...................................... 14 52063

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC ......... B64C 25/00; B64C 25/02; B64C 25/18; B64C 25/24; B64C 25/34; B64C 25/405
See application file for complete search history.

(56) References Cited

U.S. PATENT DOCUMENTS 1,359,566 A * 11/1920 Bender ................... B64C 25/36 244/50
1,812,143 A * 6/1931 Dugan .................... B64C 15/12 244/103 S
2,287,491 A * 6/1942 Wolverton .............. B64C 25/40 244/103 S
2,320,547 A * 6/1943 Tiger ...................... B64C 25/40 244/103 S
2,404,018 A * 7/1946 Yaggy ..................... B64C 25/40 244/103 S
2,425,583 A * 8/1947 Volk ........................ B64C 25/40 244/103 S
2,460,387 A * 2/1949 Hunter .................. B64C 25/405 244/103 R (Continued)

FOREIGN PATENT DOCUMENTS

EP 2 581 305 A1 4/2013

OTHER PUBLICATIONS

Black, Aaron; The Ins and Outs of Worm Gears; <http://machinerylubrication.com/Read/1080/worm-gears>; Nov. 16, 2012 via archive.org.*

(Continued)

*Primary Examiner* — Tien Dinh
*Assistant Examiner* — Michael A Fabula
(74) *Attorney, Agent, or Firm* — Sughrue Mion, PLLC

(57) ABSTRACT

An aircraft landing gear including an axle and a wheel (5) that includes a rim (6) mounted to turn on the axle about a first rotation axis (X1), the landing gear further comprising an actuator (12) for driving the wheel (5) in rotation. The rim (6) includes obstacles (33) that project from a lateral face (F) of the rim and the driving actuator includes a lead screw (32) mounted to turn about a second rotation axis (X2) perpendicular to the first rotation axis (X1) and adapted to cooperate with the obstacles of the rim to drive the wheel in rotation.

7 Claims, 3 Drawing Sheets

(56) References Cited

U.S. PATENT DOCUMENTS

| | | | | | |
|---|---|---|---|---|---|
| 3,059,712 | A * | 10/1962 | Hautau | B64C 25/405 | 180/10 |
| 3,428,274 | A * | 2/1969 | Ellis | B64C 25/40 | 244/103 R |
| 3,542,318 | A * | 11/1970 | Ellsworth | B64C 25/40 | 244/103 S |
| 3,814,354 | A * | 6/1974 | Reese | B64C 25/405 | 244/103 S |
| 3,850,389 | A * | 11/1974 | Dixon | B64C 25/405 | 244/103 S |
| 3,919,899 | A * | 11/1975 | Parker, Jr. | F16H 48/08 | 475/228 |
| 8,646,722 | B2 * | 2/2014 | Elliot | B64C 25/50 | 244/50 |
| 9,211,948 | B2 * | 12/2015 | Osman | B64C 25/405 | |
| 2013/0026284 | A1 * | 1/2013 | Christensen | B64C 25/405 | 244/50 |
| 2013/0200210 | A1 * | 8/2013 | Oswald | B64C 25/405 | 244/50 |
| 2013/0233969 | A1 * | 9/2013 | Charles | B64C 25/36 | 244/103 R |
| 2014/0225421 | A1 * | 8/2014 | Oswald | B64C 25/405 | 301/6.2 |
| 2015/0210384 | A1 * | 7/2015 | Geck | B64C 25/405 | 244/50 |

OTHER PUBLICATIONS

French Search Report for FR 14 52063 dated Dec. 1, 2014.
Written Opinion for FR 14 52063 dated Mar. 12, 2014.

* cited by examiner

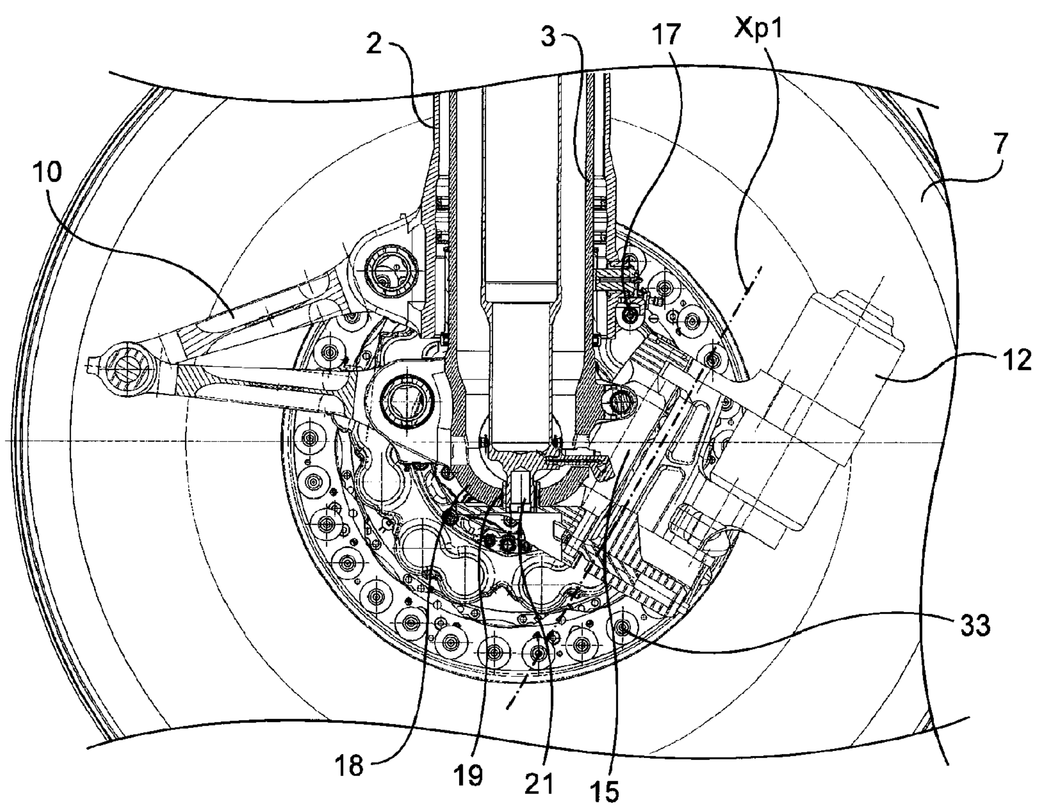
Fig. 3
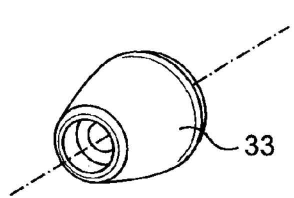
Fig. 7a
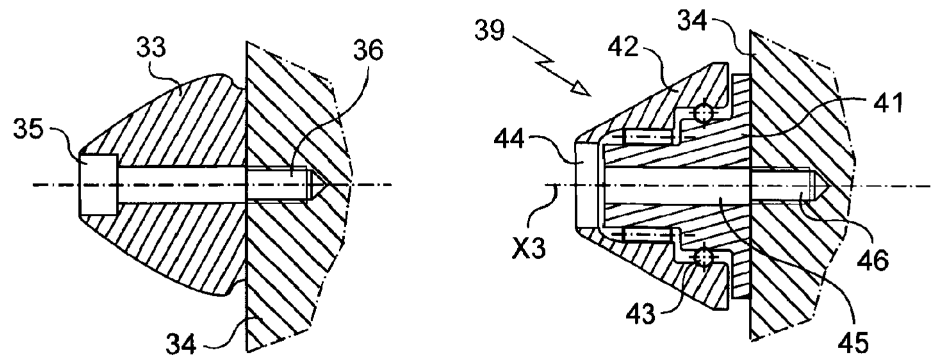
Fig. 7b
Fig. 8

AIRCRAFT LANDING GEAR EQUIPPED WITH WHEEL DRIVING MEANS

The invention concerns an aircraft landing gear on which is mounted an actuator for driving a wheel in rotation, said actuator including a lead screw cooperating with obstacles projecting from a lateral face of the rim of the wheel.

BACKGROUND OF THE INVENTION

A certain number of reasons are pushing aircraft manufacturers to attempt to motorize the wheels of the aircraft, notably using driving actuators equipped with electric motors. Such motorization in fact has major environmental and economic advantages (reduction of fuel consumption, reduction of noise when taxiing, etc.), and makes it possible to implement new functions: manoeuvring of the aircraft when the engines are stopped, reversing, remote control of the aircraft on the ground, etc.

Those designing and fitting aircraft wheel driving actuators must make the actuators conform to numerous technical requirements specified by aircraft manufacturers that are particularly constraining.

The increase in the mass of the aircraft resulting from the incorporation of driving actuators must be controlled and reasonable, so as not to render negligible the benefit in terms of fuel consumption resulting from the use of these actuators. Now, the rotation speeds at which the wheels of the aircraft must be driven and the torques that the driving actuators must develop are high and necessitate heavy and bulky actuators.

It is moreover important to ensure that the presence of the driving actuators does not interfere with maintenance operations effected on the landing gear of the aircraft. In particular, it is desirable to minimize the impact of the presence of these actuators on the time taken to remove a wheel and on the time taken to remove a tire from the wheel on which it is mounted.

It is moreover a requirement that the driving actuators can be installed easily on the landing gear of different types of aircraft without major integration effort. Now, the mechanical interfaces of the landing gear legs, the wheels and the brakes equipping the wheels can vary greatly between two aircraft of different types.

OBJECT OF THE INVENTION

The invention consists in an aircraft landing gear including a driving actuator conforming to the requirements referred to above.

SUMMARY OF THE INVENTION

To achieve this objective, there is proposed an aircraft landing gear including an axle and a wheel that includes a rim mounted to turn on the axle about a first rotation axis, the landing gear further including an actuator for driving the wheel in rotation. In accordance with the invention, the rim includes obstacles that project from a lateral face of the rim and the driving actuator includes a lead screw mounted to turn about a second rotation axis perpendicular to the first rotation axis and adapted to cooperate with the obstacles of the rim to drive the wheel in rotation.

The obstacles constitute a toothed ring with which the lead screw of the driving actuator cooperates, said toothed ring being simple to manufacture and relatively light in weight since it consists only of the obstacles and the means for fixing them to the rim. Moreover, the use of the lead screw makes it possible to obtain a mechanical connection having a high demultiplication ratio. It is therefore possible to reduce the torque that an electric motor of the driving actuator must develop at the same time as increasing the speed of said motor, which makes it possible to reduce the overall size and the mass of said motor of the actuator.

The use of obstacles projecting from the lateral face of the rim, when these obstacles are placed at a certain distance from the center of the rim, makes it possible to position the driving actuator away from a highly congested area situated between the landing gear leg and the wheel. Sufficient space is therefore available for moving the driving actuator away when it is not necessary for the latter to drive the wheel in rotation. Accordingly, at the time of removing the wheel, the driving actuator is moved away from the wheel and mechanically decoupled from the latter, which facilitates removal. Likewise, the presence of obstacles projecting from a lateral face of the rim does not interfere with removing a tire from the wheel.

Finally, it is relatively simple and not very costly to use the driving actuators on landing gear of aircraft of different types. It suffices in fact to mount the obstacles on the lateral face of the rims of the wheels to be driven and to design a mechanical support carrying the driving actuator and suitable for the landing gear in question. It is therefore not necessary either to make major modifications to the mechanical interfaces of the wheels and the landing gear to accommodate the actuators or to modify the driving actuators as a function of the landing gear.

BRIEF DESCRIPTION OF THE DRAWINGS

The invention will be better understood in the light of the following description with reference to the figures of the appended drawings, in which:

FIG. 3 is a sectional view of the landing gear in accordance with the invention on a section plane parallel to the lateral faces of the wheels of the landing gear and passing through the center of a leg of the landing gear;

Figure 4A:
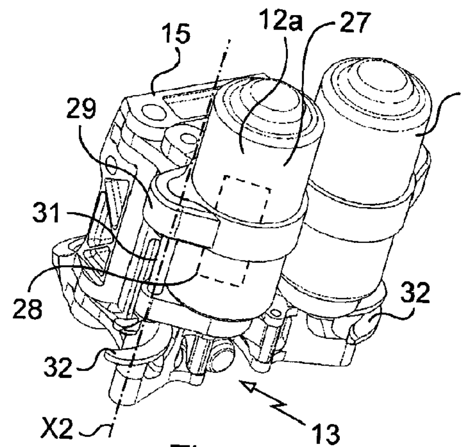
Figure 4B:
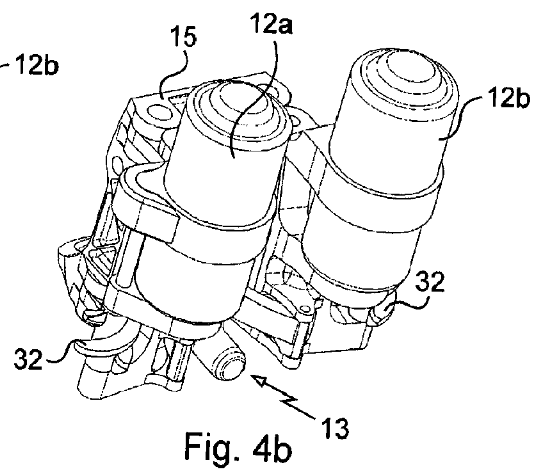
Figure 5A:
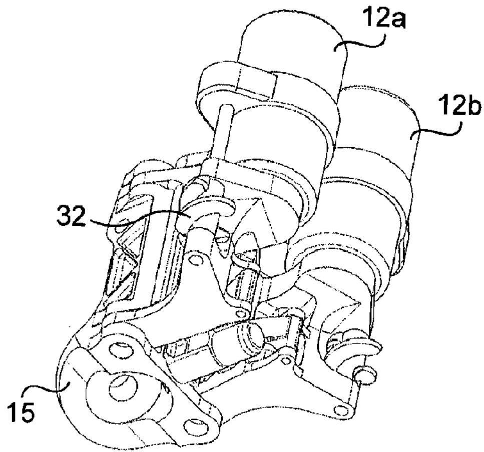
Figure 5B:
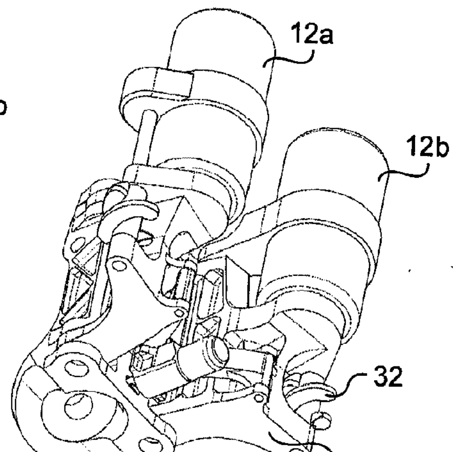

FIG. **4*a*** is a perspective view from above of driving means including first and second driving actuators, a meshing actuator and an actuator support, the driving actuators being in a release position;

FIG. **4*b* is a view analogous to that of FIG. 4*a*** in which the driving actuators are in a meshing position;

FIG. **5*a* is a view from below analogous to that of FIG. 4*a***;

FIG. **5*b* is a view from below analogous to that of FIG. 4*b***;

FIG. **6*a* is a rear view analogous to that of FIG. 4*a***;

FIG. **6*b* is a rear view analogous to that of FIG. 4*b***;

FIGS. **7*a* and 7*b*** represent one of the obstacles with which the lead screw of a driving actuator cooperates in a first embodiment of the invention;

FIG. 8 represents an obstacle in accordance with a second embodiment of the invention.

DETAILED DESCRIPTION OF THE INVENTION

Figure 1:
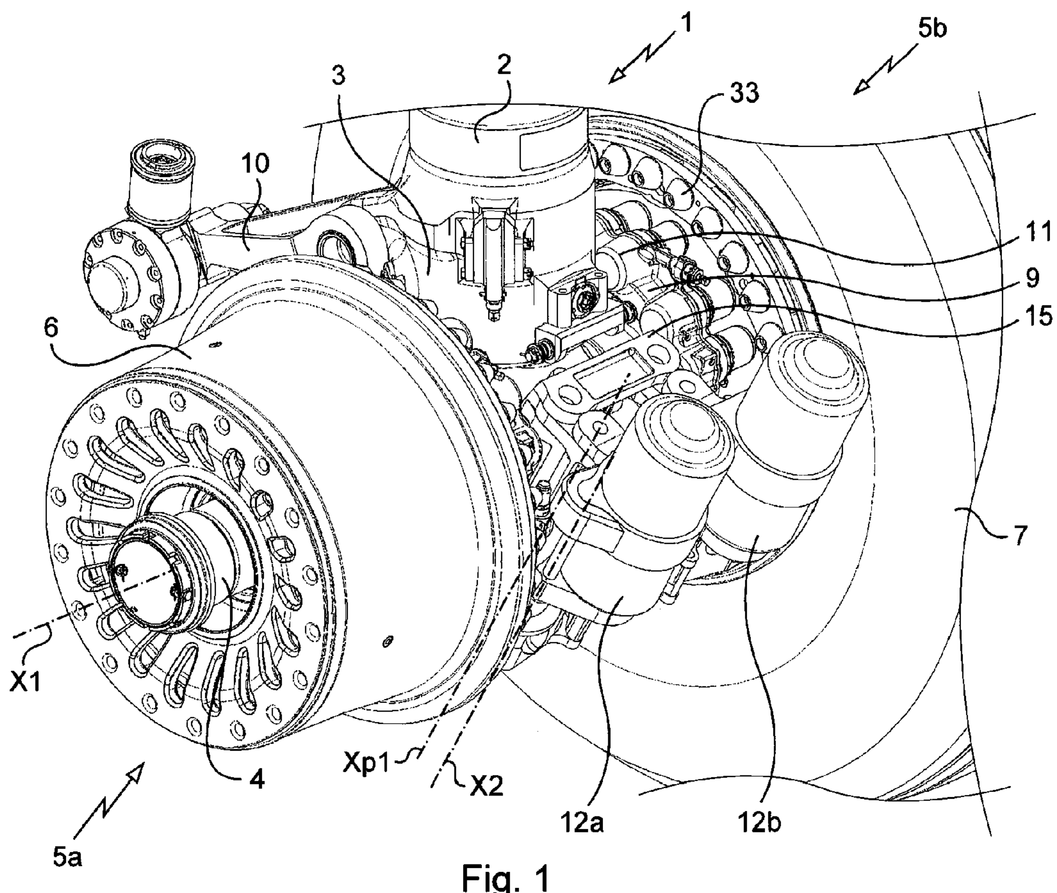
FIG. 1 is a perspective view of landing gear in accordance with the invention bearing two wheels each adapted to be driven in rotation by a driving actuator, the driving actuators being in a meshing position, the tire of one of these two wheels having been omitted for clarity.
Figure 2:
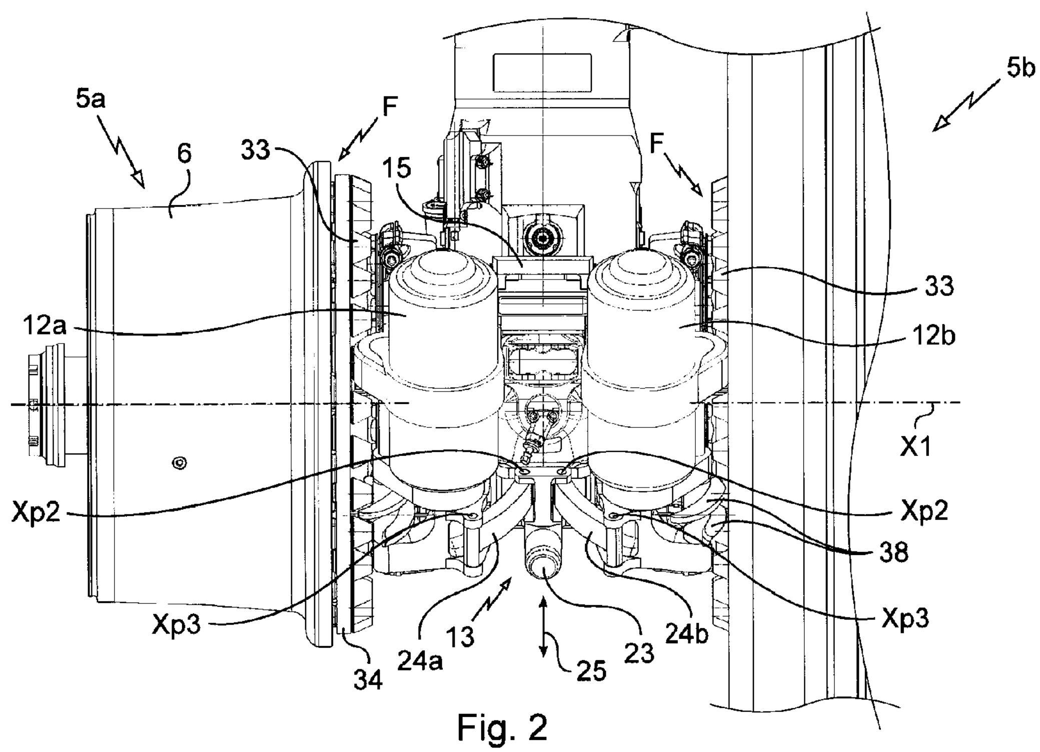
FIG. 2 is a front view of landing gear analogous to that from FIG. 1.

Referring to FIGS. 1 and 2, the landing gear 1 in accordance with a first embodiment of the invention here includes in the conventional way a strut assembly 2 articulated to the structure of an aircraft in which a sliding rod 3 is mounted to slide telescopically. The sliding rod 3, represented here in an entirely retracted position, carries at its end an axle 4 supporting a first wheel 5*a* and a second wheel 5*b*. A compass arm 10 connects the strut assembly 2 and the sliding rod 3 to ensure sliding without rotation of the sliding rod 3.

Each wheel 5*a*, 5*b* includes a rim 6 that carries a tire 7 and that is mounted to turn on the axle 4 about an axis of the axle 4 or first rotation axis X1 by means of bearings. Each wheel 5*a*, 5*b* is furthermore equipped with a brake adapted to brake the wheel, the brake including a stack of carbon disks inside the rim 6 of the wheel and not visible in the figures, a ring 9 fixed to the axle 4, and a plurality of electromechanical actuators 11 carried by the ring 9 and adapted selectively to apply a braking force to the stack of disks.

The landing gear 1 of the invention furthermore includes means for driving the wheels 5*a*, 5*b* of the aircraft in rotation, said driving means including a first actuator 12*a* for driving the first wheel 5*a* in rotation, a second actuator 12*b* for driving the second wheel 5*b* in rotation, a meshing actuator 13, and an actuator support 15 mounted on the sliding rod 3 of the landing gear 1 and carrying the first and second driving actuators 12*a*, 12*b* and the meshing actuator 13.

Figure 6A:
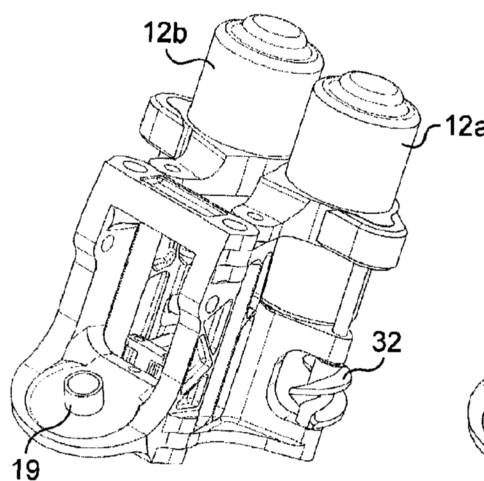
Figure 6B:
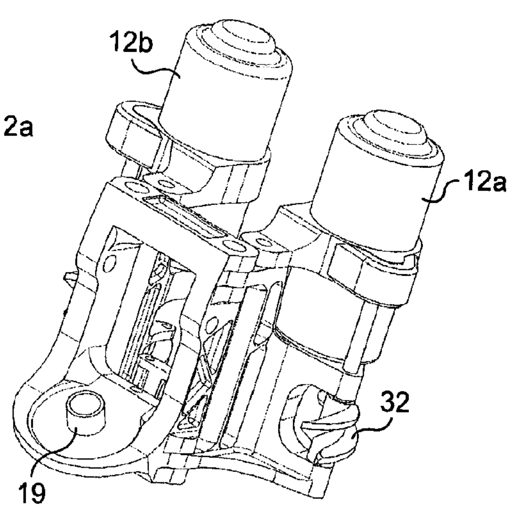

Referring to FIG. 3, the actuator support 15 is fixed to a rear compass arm axle 17 itself fastened to the sliding rod 3 and to a spherical head 18 of the sliding rod 3 via a tubular centring stud 19 (seen better in FIGS. 6*a* and 6*b*) that extends inside the sliding rod 3 through a bore 21 provided in the latter.

The first and second driving actuators 12*a*, 12*b* are each mounted to pivot on the actuator support 15 about parallel first pivot axes Xp1 situated on either side of the actuator support 15 so as to move toward or away from the rim 6 of the first wheel 5*a* and the rim 6 of the second wheel 5*b*, respectively.

For its part, the meshing actuator 13 includes an electric motor, an actuating member 23, a first arm 24*a* and a second arm 24*b*. The electric motor of the meshing actuator 13 is adapted to move the actuating member 23 selectively away from or toward the actuating member 23 of the actuator support 15 in a linear movement represented by the double-headed arrow 25 in FIG. 2.

The first and second arms 24*a*, 24*b* are each mounted to pivot at one of their ends on the actuating member 23 about second pivot axes Xp2 and at the other of their ends on the first and second driving actuators 12*a*, 12*b*, respectively, about third pivot axes Xp3 situated on the first and second driving actuators 12*a*, 12*b* (the pivot axes Xp2 and Xp3 can be seen in FIG. 2). The second pivot axes Xp2 and the third pivot axes Xp3 are all parallel to the first pivot axes Xp1. Accordingly, movement of the actuating member 23 away from the actuator support 15 simultaneously moves the first and second driving actuators 12*a*, 12*b* toward the rims 6 of the first and second wheels 5*a*, 5*b*, and movement of the actuating member 23 toward the actuator support 15 simultaneously moves the first and second driving actuators 12*a*, 12*b* away from the rims 6 of the first and second wheels 5*a*, 5*b*.

The meshing actuator 13 is thus adapted to move the driving actuators 12 simultaneously between a meshing position, in which they are positioned to drive the wheels 5*a*, 5*b* in rotation, and a release position, in which they are away from the wheels 5*a*, 5*b* and allow the latter to rotate freely.

The operation of the driving actuators 12 and the manner in which they cooperate with the wheels 5*a*, 5*b* to drive them in rotation when they are in the meshing position are described in more detail next. As the first and second actuators 12*a*, 12*b* function in the same manner, their operation will be described with reference to only one driving actuator 12 and one wheel.

Referring to FIGS. 4*a* to 6*b*, and notably to FIG. 4*a*, the driving actuator 12 includes an actuator body 27, an electric motor 28 represented diagrammatically and positioned in the actuator body 27, a gearbox 29, and a transmission shaft 31 and a lead screw 32 connected to the transmission shaft 31. The transmission shaft 31 and the lead screw 32 extend outside the actuator body 27. The electric motor 28 of the driving actuator 12 is adapted to drive the transmission shaft 31 and therefore the lead screw 32 in rotation via the gearbox 29 about a second rotation axis X2 perpendicular to the axis of the axle or first rotation axis X1.

The rim 6 of the wheel includes obstacles 33 that project from a lateral face F of the rim 6 facing the associated driving actuator 12. These obstacles 33, more precisely visible in FIGS. 7*a* and 7*b*, are removable rollers 33 attached to a support ring 34 fixed to the circumference of the lateral face F of the rim 6. Each roller 33 includes a smooth first hole 35 extending through the roller 33 from one side to the other. When the roller 33 is mounted on the support ring 34, the smooth first hole 35 is extended by a threaded second hole 36 in the support ring 34. The roller 33 is fixed to the support ring 34 by a bolt extending through the smooth first hole 35 and into the threaded second hole 36.

Here the rollers 33 are parts subject to wear, intended to be replaced at a predetermined frequency, for example at a frequency equal to that of replacing the tires 7 of the wheels.

When the driving actuator 12 is in the driving position and the electric motor 28 of the driving actuator 12 is powered, the lead screw 32 cooperates with the rollers 33 to drive the wheel in rotation. Note that, depending on the direction of rotation of the electric motor 28 and therefore the direction of rotation of the lead screw 32, the wheel 5*a*, 5*b* is driven in rotation in a direction tending either to move the aircraft forward or to move the aircraft backward.

The lead screw 32 of the driving actuator 12 here includes two threads 38 (visible in FIG. 1): this increases the demultiplication ratio of the connection between the lead screw 32 and the rollers 33 and reduces the stresses applied to each thread 38 of said lead screw 32. Note also that the threads 38 have a helix angle sufficiently large, given the coefficient of friction of the connection between the lead screw 32 and the rollers 33, to render this connection reversible.

If necessary the actuator 12 is provided with a clutch device between the gearbox 29 and the lead screw 32. This clutch device makes it possible to uncouple the lead screw 32 from the gearbox 29, to facilitate meshing of the lead screw 32 and the rollers 33 when the driving actuator 12 comes into the meshing position when the wheel of the aircraft is already rotating at a non-zero speed.

In a second embodiment of the invention, and referring to FIG. 8, the rollers 39 are mounted to pivot freely about axes X3 parallel to the first rotation axis X1. Each roller 39 includes here a base 41 forming a fixed interior race of a ball bearing, an upper part 42 forming an exterior race of the ball bearing, and balls 43 disposed on a raceway of the exterior race. The upper part 42 of each roller 39 includes a first threaded hole 44. The base 41 includes a second threaded hole 45 passing through the base 41 from one side to the other and extending the first threaded hole 44. When the roller 39 is mounted on the support ring 34, the first and second threaded holes 44, 45 are extended by a third threaded hole 46 in the support ring 34. The roller 39 is fixed to the support ring 34 by a bolt extending through the first and second threaded holes 44, 45 and into the third threaded hole 46.

The invention is not limited to the particular embodiments that have just been described and to the contrary covers any variant falling within the scope of the invention as defined by the claims.

Although it has been stated that the lead screws are provided with two threads, the invention applies to lead screws provided with at least one thread.

Although, in the case of each wheel represented here, the rollers are mounted on the lateral face of the rim by being attached to an intermediate support, in this instance to a support ring itself fixed to the lateral surface of the rim of the wheel, it is perfectly possible to attach the rollers directly to the lateral face of the rim or to use an intermediate support of different shape.

Moreover, although here the wheels are equipped with brakes, the invention of course applies to landing gear equipped with wheels not provided with brakes, such as an aircraft auxiliary landing gear.

The invention claimed is:

1. An aircraft landing gear comprising:
an axle (4);
a wheel (5*a*) that includes:
a rim (6) mounted to turn on the axle (4) about a first rotation axis (X1),
wherein the rim (6) includes obstacles (33, 39) rotatably mounted and
laterally projecting from a lateral face (F) of the rim, and
an actuator (12) for driving of the wheel (5*a*) in rotation,
wherein the actuator includes a lead screw (32) mounted to turn about a second rotation axis (X2) perpendicular to the first rotation axis (X1) and positioned to cooperate with the obstacles of the rim to drive the wheel in rotation.

2. The aircraft landing gear according to claim 1, wherein the lead screw includes at least one thread (38) having a helix angle sufficiently large to render reversible the connection between the lead screw (32) and the obstacles (33, 39).

3. The aircraft landing gear according to claim 1, wherein the obstacles are removable and attached to the lateral face (F) of the rim or to an intermediate support mounted on the lateral face of the rim.

4. The aircraft landing gear according to claim 3, wherein at least one obstacle is fixed to the lateral face of the rim by means of at least one bolt that passes through the obstacle and is screwed into the rim or into the intermediate support.

5. The aircraft landing gear according to claim 3, wherein the obstacles (39) are mounted to pivot freely about axes (X3) parallel to the rotation axis of the wheel.

6. An aircraft landing gear comprising:
an axle;
first and second wheels (5*a*, 5*b*) each including:
a respective rim (6) mounted to turn on the axle,
wherein each respective rim has obstacles (33, 39) rotatably mounted and
laterally projecting from a lateral face (F) of the rim,
a first actuator (12*a*) for driving the first wheel (5*a*) in rotation,
a second actuator (12*b*) for driving the second wheel (5*b*) in rotation,
wherein each actuator including a lead screw (32) positioned to cooperate with the obstacles (33, 39) of the respective rim (6) of the first wheel and with the obstacles (33, 39) of the respective rim of the second wheel; and
a meshing actuator (13) operative to move the first and second driving actuators simultaneously between a meshing position, in which the lead screws of the first and second actuators respectively cooperate with the obstacles of the respective rims (6) of the first and second wheels, and a release position, in which the lead screws are positioned away from the respective rims of the first and second wheels.

7. The aircraft landing gear according to claim 6, wherein the first and second driving actuators (12*a*, 12*b*) are each mounted to pivot on the landing gear to move toward or away from the respective rims,
wherein the meshing actuator includes:
an actuation member (23), and
first and second arms (24*a*, 24*b*) each mounted at one of their ends to pivot on the actuating member and at the other of their ends to the first and second driving actuators, respectively, so that rectilinear movement of the actuating member (23) causes simultaneous movement of the first and second driving actuators toward or away from the respective rims of the first and second wheels.

* * * * *